United States Patent
Shull

(10) Patent No.: US 7,725,234 B2
(45) Date of Patent: May 25, 2010

(54) SYSTEM FOR CONTROLLING IMPLEMENT POSITION

(75) Inventor: Andrew G. Shull, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 957 days.

(21) Appl. No.: 11/495,484

(22) Filed: Jul. 31, 2006

(65) Prior Publication Data

US 2008/0027610 A1 Jan. 31, 2008

(51) Int. Cl.
- G06F 7/70 (2006.01)
- G06F 19/00 (2006.01)
- G06G 7/00 (2006.01)
- G06G 7/76 (2006.01)

(52) U.S. Cl. ............... 701/50; 701/82; 172/2; 37/414

(58) Field of Classification Search ............. 701/50–66, 701/82; 172/2–5, 9–10; 37/414
See application file for complete search history.

(56) References Cited

U.S. PATENT DOCUMENTS

| | | | |
|---|---|---|---|
| 4,107,859 A | | 8/1978 | Keith |
| 4,157,118 A | | 6/1979 | Suganami et al. |
| 4,194,574 A | | 3/1980 | Benson et al. |
| 4,244,123 A | | 1/1981 | Lazure et al. |
| 4,385,353 A | * | 5/1983 | Schneider ............ 701/50 |
| 4,503,916 A | * | 3/1985 | Wiegardt ............ 172/3 |
| 4,518,044 A | * | 5/1985 | Wiegardt et al. ........ 172/7 |
| 4,630,685 A | | 12/1986 | Huck, Jr. et al. |
| 4,818,107 A | | 4/1989 | Ono et al. |
| 4,888,890 A | | 12/1989 | Studebaker et al. |
| 4,979,092 A | * | 12/1990 | Bergene et al. ........ 700/28 |
| 5,100,229 A | | 3/1992 | Lundberg et al. |
| 5,113,957 A | * | 5/1992 | Tamai et al. ........ 172/10 |
| 5,144,317 A | | 9/1992 | Duddek et al. |
| 5,190,111 A | | 3/1993 | Young et al. |

(Continued)

FOREIGN PATENT DOCUMENTS

AU 745270 2/1999

(Continued)

OTHER PUBLICATIONS

International Search Report for PCT/US2007/014545 (4 pages).

(Continued)

*Primary Examiner*—Khoi Tran
*Assistant Examiner*—Jaime Figueroa
(74) *Attorney, Agent, or Firm*—Finnegan, Henderson, Farabow, Garrett & Dunner

(57) ABSTRACT

A system for controlling implement position including a method for controlling movement of an implement is disclosed. The method includes determining a first parameter configured to affect control of the implement with respect to a first timing. The method also includes determining a second parameter configured to affect control of the implement with respect to a second timing. The second timing is shorter than the first timing. The method also includes selectively establishing a third parameter as a function of the first and second parameters when the second parameter is greater than a predetermined value. The method further includes controlling a position of the implement as a function of the third parameter.

12 Claims, 2 Drawing Sheets

U.S. PATENT DOCUMENTS

| | | | | | |
|---|---|---|---|---|---|
| 5,261,495 | A | * | 11/1993 | Szymczak | 172/2 |
| 5,265,705 | A | * | 11/1993 | Takasugi et al. | 192/3.55 |
| 5,293,944 | A | | 3/1994 | Matsumoto | |
| 5,320,186 | A | * | 6/1994 | Strosser et al. | 172/8 |
| 5,339,906 | A | * | 8/1994 | Fox et al. | 172/4 |
| 5,375,663 | A | | 12/1994 | Teach | |
| 5,438,771 | A | | 8/1995 | Sahm et al. | |
| 5,461,803 | A | | 10/1995 | Rocke | |
| 5,462,122 | A | | 10/1995 | Yamamoto et al. | |
| 5,467,829 | A | * | 11/1995 | Barton et al. | 172/4.5 |
| 5,471,391 | A | | 11/1995 | Gudat et al. | |
| 5,472,056 | A | * | 12/1995 | Orbach | 172/2 |
| 5,485,885 | A | | 1/1996 | Matsushita et al. | |
| 5,493,494 | A | | 2/1996 | Henderson | |
| 5,505,267 | A | * | 4/1996 | Orbach et al. | 172/3 |
| 5,535,830 | A | | 7/1996 | Matsushita et al. | |
| 5,549,166 | A | * | 8/1996 | Orbach et al. | 172/4 |
| 5,551,518 | A | | 9/1996 | Stratton | |
| 5,560,431 | A | * | 10/1996 | Stratton | 172/2 |
| 5,564,507 | A | | 10/1996 | Matsushita et al. | |
| 5,574,643 | A | | 11/1996 | Yesel | |
| 5,600,436 | A | | 2/1997 | Gudat | |
| 5,612,864 | A | | 3/1997 | Henderson | |
| 5,617,723 | A | * | 4/1997 | Hosseini et al. | 60/327 |
| 5,631,658 | A | | 5/1997 | Gudat et al. | |
| 5,646,844 | A | | 7/1997 | Gudat et al. | |
| 5,647,439 | A | | 7/1997 | Burdick et al. | |
| 5,659,985 | A | | 8/1997 | Stump | |
| 5,666,792 | A | | 9/1997 | Mullins | |
| 5,684,476 | A | | 11/1997 | Anderson | |
| 5,684,691 | A | * | 11/1997 | Orbach et al. | 700/56 |
| 5,694,317 | A | | 12/1997 | Nakagami et al. | |
| 5,721,679 | A | | 2/1998 | Monson | |
| 5,735,352 | A | | 4/1998 | Henderson et al. | |
| 5,755,291 | A | * | 5/1998 | Orbach et al. | 172/2 |
| 5,764,511 | A | | 6/1998 | Henderson | |
| 5,771,978 | A | | 6/1998 | Davidson et al. | |
| 5,810,095 | A | * | 9/1998 | Orbach et al. | 172/2 |
| 5,819,190 | A | | 10/1998 | Nakagami et al. | |
| 5,835,874 | A | | 11/1998 | Hirata et al. | |
| 5,848,368 | A | | 12/1998 | Allen et al. | |
| 5,884,204 | A | * | 3/1999 | Orbach et al. | 701/50 |
| 5,887,669 | A | * | 3/1999 | Ostler et al. | 180/53.4 |
| 5,911,769 | A | * | 6/1999 | Orbach et al. | 701/50 |
| 5,987,371 | A | | 11/1999 | Bailey et al. | |
| 6,016,875 | A | * | 1/2000 | Orbach et al. | 172/2 |
| 6,058,342 | A | | 5/2000 | Orbach et al. | 701/50 |
| 6,116,847 | A | * | 9/2000 | Ginn et al. | 414/722 |
| 6,119,786 | A | * | 9/2000 | Creger et al. | 172/7 |
| 6,125,561 | A | | 10/2000 | Shull | |
| 6,141,612 | A | * | 10/2000 | Flamme et al. | 701/50 |
| 6,181,999 | B1 | * | 1/2001 | Yamamoto et al. | 701/50 |
| 6,216,072 | B1 | * | 4/2001 | Boe et al. | 701/50 |
| 6,246,939 | B1 | * | 6/2001 | Nozawa | 701/50 |
| 6,317,676 | B1 | * | 11/2001 | Gengler et al. | 701/82 |
| 6,336,068 | B1 | | 1/2002 | Lawson et al. | |
| 6,631,320 | B1 | | 10/2003 | Holt et al. | |
| 6,718,246 | B2 | | 4/2004 | Griffith et al. | |
| 6,725,105 | B2 | * | 4/2004 | Francis et al. | 700/75 |
| 6,820,699 | B1 | * | 11/2004 | Bettin | 172/2 |
| 6,845,311 | B1 | * | 1/2005 | Stratton et al. | 701/50 |
| 7,051,498 | B2 | | 5/2006 | Modzik et al. | |
| 2004/0117092 | A1 | * | 6/2004 | Budde | 701/50 |

FOREIGN PATENT DOCUMENTS

| | | |
|---|---|---|
| DE | 3604218 | 2/1987 |
| DE | 195 10376 A1 | 9/1995 |
| EP | 0 280 376 | 6/1984 |
| EP | 0 443 026 A1 | 8/1991 |
| GB | 2 228 507 A | 8/1990 |
| JP | 62-268433 | 11/1987 |
| WO | WO-97/01105 | 1/1997 |

OTHER PUBLICATIONS

U.S. Appl. No. 11/214,993, filed Aug. 31, 2005.
U.S. Appl. No. 11/238,933, filed Sep. 29, 2005 (5130).
U.S. Appl. No. 11/299,066, filed Dec. 8, 2005 (5516).

* cited by examiner

… (US 7,725,234 B2)

SYSTEM FOR CONTROLLING IMPLEMENT POSITION

TECHNICAL FIELD

The present disclosure relates to a system for controlling position and, more particularly, to a method and apparatus for controlling implement position.

BACKGROUND

Mobile machines, such as, for example, dozers, tractors, rippers, plows, and/or scrapers, often include one or more material engaging implements configured to manipulate material, e.g., transport, cultivate, dig, or otherwise disturb the ground and/or material piles. The material often includes soil, rocks, sand, and/or materials which affect the material's characteristics, e.g., hard, soft, rocky, homogeneous, or other properties known in the art. Machines, powered by an engine operatively connected to one or more traction devices, typically traverse a site that has changing terrain, such as, varying grades, e.g., inclines or declines, and the material associated with the site often has varying characteristics, e.g., soft soil changes to hard soil or a mixture of soil and relatively small rocks changes to a mixture of soil and relatively large rocks. The magnitude of resistance an implement applies to machine movement is influenced by the depth at which an implement engages the material and the characteristics of the material. That is, an implement that engages soft soil at a shallow depth applies relatively less resistance to machine movement than an implement that engages hard soil at a deep depth.

Too much or too little resistance may be undesirably cause machine vibration or poor engine operation, e.g., the loading on the engine is too large or small. Typically, manual control of a machine and associated implements with respect to changing terrain and changing material characteristics is complicated and requires a significant amount of skill. An operator typically adjusts the depth an implement engages the material or penetrates the surface thereof, e.g., a depth of cut, in response to changing material characteristics so as to operate the machine within a desirable set of conditions, e.g., below an engine torque limit.

U.S. Pat. No. 4,518,044 ("the '044 patent") issued to Wiegardt et al. discloses a vehicle with a control system for raising and lowering an implement. The control system of the '044 patent senses parameters, including wheel slip, engine speed, and draft force. The control system of the '044 patent determines parameter error signals as a function of the sensed parameters and predetermined threshold values. The parameter error signals are combined into a composite error signal representing a vehicle load. The system of the '044 patent also determines a position error signal as a function of a desired operator position command and a sensed implement position. The system of the '044 patent compares the composite load error and the position error and operates to raise or lower the implement in response to the more positive error.

The reactionary control of the system of the '044 patent may inadequately respond to both steady state and transient load changes. Additionally, the composite error of the system of the '044 patent may be undesirably slow with respect to rapid changes in loads encountered by the implement. Furthermore, the system of the '044 patent may determine the composite error via a complex algorithm.

The present disclosure is directed to overcoming one or more of the shortcomings set forth above.

SUMMARY OF THE INVENTION

In one aspect, the present disclosure is directed to a method for controlling movement of an implement. The method includes determining a first parameter configured to affect control of the implement with respect to a first timing. The method also includes determining a second parameter configured to affect control of the implement with respect to a second timing. The second timing is shorter than the first timing. The method also includes selectively establishing a third parameter as a function of the first and second parameters when the second parameter is greater than a predetermined value. The method further includes controlling a position of the implement as a function of the third parameter.

In another aspect, the present disclosure is directed to a system for controlling an implement. The system includes at least one hydraulic actuator operatively connecting the implement to a frame of a machine. The system also includes a traction device operatively connected to the frame and configured to propel the machine relative to a surface. The system also includes a first sensor configured to sense a pressure of pressurized fluid associated with the at least one hydraulic actuator, a second sensor configured to sense a speed of a driven component of the traction device, and a third sensor configured to sense a speed of the machine with respect to the surface. The system further includes a controller. The controller is configured to receive a plurality of signals indicative of the sensed pressure, the speed of the driven component, and the speed of the machine. The controller is also configured to determine a steady state command and a transient command as a function of the received plurality of signals and determine an output command configured to affect the position of the implement as a function of the steady state command and selectively as a function of the transient command.

In yet another aspect, the present disclosure is directed to a machine. The machine includes at least one traction device having a driven component and at least one implement configured to selectively engage a material. The machine also includes a first, a second, and a third sensor each configured to sense a first, a second, and a third parameter, respectively. The system also includes a controller configured to receive first, second, and third signals indicative of the first, second, and third sensed parameters, respectively. The controller is also configured to determine a first value as a function of at least the first signal and determine a second value as a function of at least the third signal. The controller is further configured to affect a position of the implement as a function of the first value when the second value is below a predetermined value and affect a position of the implement as a function of the first and second values when the second value is above the predetermined value.

DETAILED DESCRIPTION

Figure 1:
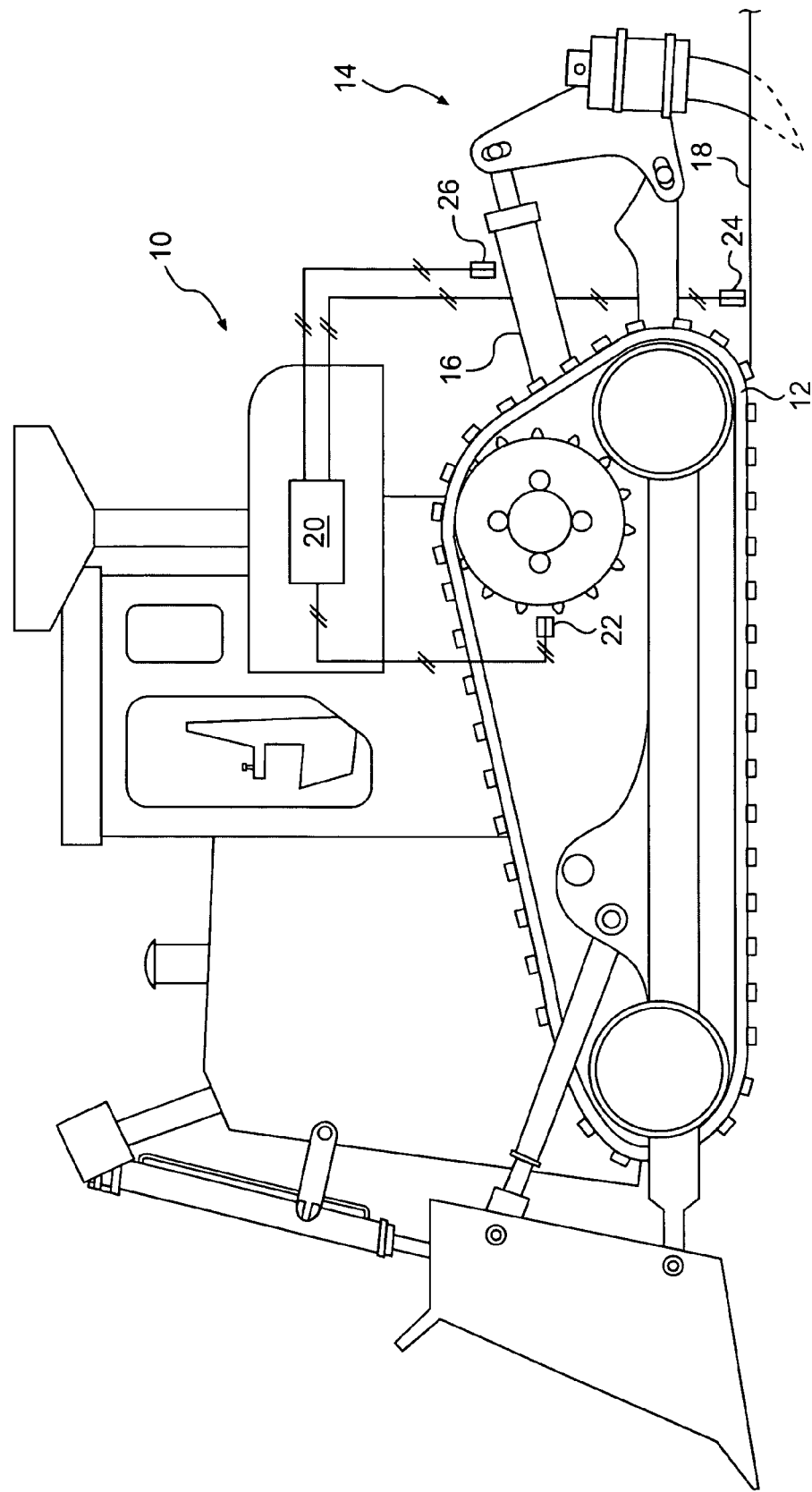
FIG. 1 is a diagrammatic illustration of an exemplary machine in accordance with the present disclosure.

FIG. 1 illustrates an exemplary machine 10. Machine 10 may include any mobile machine that performs some type of operation associated with an industry, such as, for example, mining, construction, farming, or any other industry known in the art. For example, machine 10 may be an earth moving machine such as a dozer, a loader, a backhoe, an excavator, a motor grader, or any other earth moving machine. Machine 10 may be configured to traverse a work site to manipulate material, e.g., transport, cultivate, dig, agitate, and/or perform any other operation known in the art. Machine 10 may include a traction device 12, at least one implement 14, and a controller 20. It is contemplated that machine 10 may additionally include a power source (not shown) configured to produce mechanical power, a frame (not referenced) configured to connect one or more components of machine 10, and/or any other component known in the art.

Traction device 12 may include tracks located on each side of machine 10 (only one side shown) operatively driven by one or more sprockets (not referenced). Traction device 12 may include one or more driven components, e.g., a sprocket or an axle, one or more non-driven components, e.g., a guide wheel or a hub, and/or additional components known in the art. The driven components may be operatively connected to the power source and receive mechanical power therefrom to provide movement to traction device 12. Movement of traction device 12 may propel machine 10 with respect to the material, e.g., the ground. It is contemplated that traction device 12 may additionally or alternately include wheels, belts, or other traction devices which may or may not be steerable. It is also contemplated that traction device 12 may be hydraulically controlled, mechanically controlled, electronically controlled, or controlled in any other suitable manner.

Implement 14 may include any device used in the performance of a task. For example, implement 14 may include a blade, a bucket, a shovel, a ripper, and/or any other task-performing device known in the art. Implement 14 may be connected to the frame of machine 10 via a linkage system with a hydraulic actuator 16 forming a member in the linkage system, and/or in any other suitable manner. Implement 14 may be configured to pivot, rotate, slide, swing, and/or move relative to the frame of work machine 10 in any manner known in the art. Implement 14 may further be configured to penetrate a surface 18 of the material, e.g., the ground, to perform a task configured to disturb or disrupt, the material. For example, implement 14 may engage the material to push, scoop, slice, tear, rake, and/or perform any other type of task known in the art. The depth of cut of implement 14, i.e., the distance below surface 18 that implement 14 penetrates, may be adjusted by the actuation of hydraulic actuator 16 and may be controlled by controller 20.

Hydraulic actuator 16 may include a piston-cylinder arrangement, a hydraulic motor, and/or any other known hydraulic actuator having one or more fluid chambers therein. For example, hydraulic actuator 16 may embody a piston-cylinder assembly (as illustrated in FIG. 1) and a hydraulic system (not shown) may selectively supply and drain pressurized fluid from one or more chambers within the cylinder to affect movement of a piston-rod assembly as is known in the art. The expansion and retraction of hydraulic actuator 16 may function to assist in moving implement 14 with respect to the frame of machine 10 and surface 18. Alternatively, hydraulic actuator 16 may embody a hydraulic motor and a hydraulic system (not shown) may selectively supply and drain pressurized fluid from one or more chambers therein to affect rotary motion of an output shaft as is known in the art. Rotary motion of hydraulic actuator 16 may assist in moving implement 14 with respect to the frame of machine 10 and surface 18.

The pressure of the pressurized fluid within a chamber of hydraulic actuator 16 may be influenced by the amount of pressurized fluid directed toward that chamber and the amount of resistance an external load may apply against actuator movement. For example, a hydraulic system may selectively direct pressurized fluid from a source of pressurized fluid, e.g., a pump, toward a first chamber via one or more valves to extend the piston-rod. Pressurized fluid in a second chamber, e.g., a chamber on an opposite side of the piston from the first chamber, may resist movement of a piston and thus the piston rod. As such, pressurized fluid within the second chamber may be selectively directed from the second chamber to a source of low pressure, e.g., a tank. Controlling the flow and pressure of pressurized fluid to first and second chambers, i.e., expanding and contracting chambers, arranged on opposite sides of a piston to adjust the speed and force that a piston-rod extends and retracts is well known in the art. Additionally, the piston-rod may directly or indirectly interact with one or more loads, e.g., implement 14, the linkage system, and/or the material which may actively and/or passively apply a counter force to the extension or retraction of the piston-rod. As such, the pressure of pressurized fluid within the one of the chambers of hydraulic actuator 16 may increase. It is contemplated that the magnitude of an increase in pressure of the pressurized fluid within a chamber of hydraulic actuator 16 may be correlated to the magnitude of the counter force applied by a load. It is also contemplated that the above discussion regarding hydraulic actuator 16 embodied as a piston-cylinder arrangement is applicable if hydraulic actuator embodies a hydraulic motor arrangement or any other type of hydraulic actuator known in the art.

Controller 20 may include one or more microprocessors, a memory, a data storage device, a communications hub, and/or other components known in the art. Specifically, controller 20 may determine a position of implement 14 and thus control the movement of implement 14. It is contemplated that controller 20 may be integrated within a general machine control system capable of controlling additional various functions of a machine 10, e.g., the power source or the hydraulic system. Controller 20 may be configured to receive input signals from one or more sensors 22, 24, 26, perform one or more algorithms to determine appropriate output signals, and may deliver the output signals to one or more components to control the depth of cut of implement 14. Specifically, controller 20 may control one or more valves and/or other components of the hydraulic system, e.g., pumps, to selectively supply pressurized fluid toward and from hydraulic actuator 16. It is contemplated that controller 20 may receive and deliver signals via one or more communication lines (not referenced) as is known in the art.

Sensors 22, 24, 26 may include any conventional sensor configured to establish a signal as a function of a sensed physical parameter. Sensor 22 may be configured to sense the speed of traction device 12 with respect to machine 10. For example, sensor 22 may be disposed adjacent a driven component, e.g., a sprocket (not referenced), configured to apply a drive force, e.g., a torque or a tension, to traction device 12. Alternatively, sensor 22 may be disposed adjacent any component of traction device 12 and/or component of machine 10 configured to impart movement to traction device 12. Sensor 24 may be configured to sense the speed of machine 10 with respect to surface 18. For example, sensor 24 may be disposed adjacent surface 18. Sensor 26 may be configured to sense the pressure of pressurized fluid within one or more chambers of hydraulic actuator 16. For example, sensor 26 may be disposed adjacent to and/or within hydraulic actuator 16. It is contemplated that sensors 22, 24, 26 may each selectively include a plurality of sensors each establishing a plurality of signals and that each plurality of signals may be combinable into a common signal. It is also contemplated that sensors 22, 24, 26 may embody any type of sensor known in the art, such as, for example, sensors 22 and 24 may embody hall sensors, global positioning signals, infrared or radar speed sensors, and sensor 26 may include a pressure transducer. It is further contemplated that sensor 26 may include a force sensor, e.g., a stress gauge, operatively connected between implement 14 and the frame of machine 10, e.g., within the linkage system.

Figure 2:
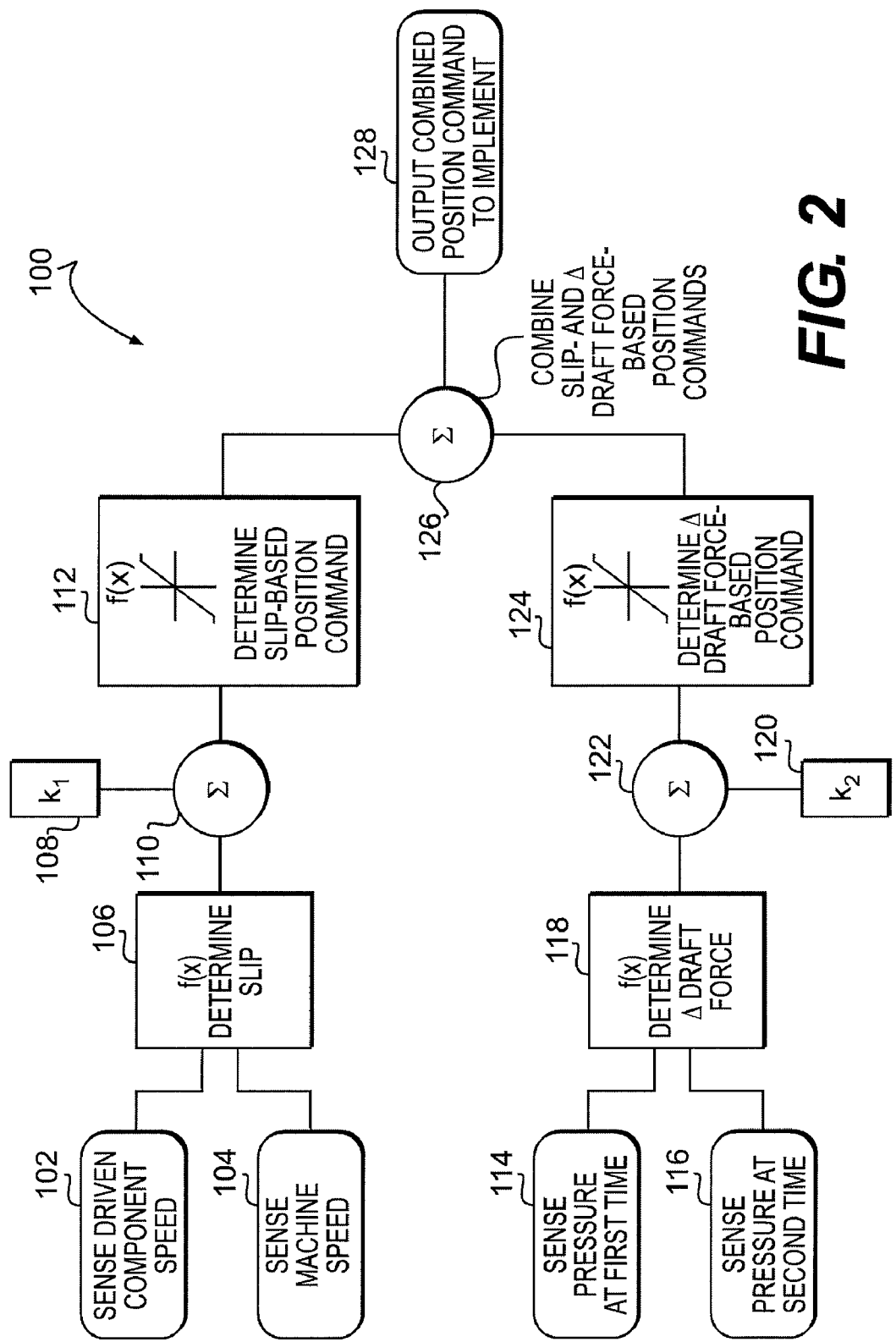
FIG. 2 is a schematic illustration of an exemplary control algorithm configured to be performed by the controller of FIG. 1.

FIG. 2 illustrates an exemplary control algorithm 100. Control algorithm 100 may be performed by controller 20 to control the movement of implement 14. Specifically, control algorithm 100 may determine an output 128, as a function of one or more parameters and may include receiving a plurality of inputs, e.g., signals generated by one or more of sensors 22, 24, 26, and perform a plurality of functional relations, e.g., algorithms, equations, subroutines, look-up maps, tables, and/or comparisons, to determine output 128 and thus influence the operation of implement 14. It is contemplated that the functional relations of control algorithm 100 described below may be performed in any order and are described herein with a particular order for exemplary purposes only. It is also contemplated that control algorithm 100 may be performed continuously, periodically, with or without a uniform frequency, and/or singularly.

Referring to FIG. 2, input 102 may include a signal indicative of a speed of traction device 12. Specifically, input 102 may be indicative of a signal produced by sensor 22 and may be representative of the speed of a driven component of traction device 12. Input 104 may include a signal indicative of a speed of machine 10. Specifically, input 104 may be indicative of a signal produced by sensor 24, which is indicative of the speed of machine 10 relative to surface 18. It is contemplated that inputs 102, 104 may be represented in any suitable and/or desirable units, e.g., revolutions per minute, feet per second, or kilometers per hour. It is also contemplated that inputs 102, 104 may be converted into digital representations of one or more values, e.g., by converting a voltage level produced by signals 22, 24 into digital signals further manipulable within control algorithm 100.

Functional relation 106 may include functionally relating driven speed, e.g., input 102, and machine speed, e.g., input 104, to determine an amount of slip, e.g., machine slip. Slip may represent the error between driven speed and machine speed and may be caused by, for example, traction device 12 "slipping" relative to surface 18 due to implement 14. Specifically, implement 14 may apply a force on machine 10 as a function of the friction between implement 14 and the material, thus resisting movement of machine 10 as propelled by traction device 12 by countering a drive force or traction force. The magnitude of slip may be influenced by the characteristics of the material and the depth of cut of implement 14, e.g., relatively low slip values may be indicative of relatively low resistance on machine 10 by implement 14. It is contemplated that zero slip may or may not be desirable and that it may be desirable to monitor and control slip within a predetermined range.

Functional relation 106 may, specifically, include determining slip by mathematically relating the driven speed and the machine speed. For example, functional relation 106 may embody the mathematical formula: $S_e = 1 - (S_m/S_d)$, wherein $S_e$ represents slip error, $S_m$ represents machine speed, and $S_d$ represents driven speed. It is contemplated that the determined slip may be represented as a value, a fraction of machine or driven speed, and/or a percentage.

Functional relation 110 may include functionally relating the determined slip, e.g., as determined within functional relation 106, and one or more predetermined values, e.g., a constant 108 to determine a slip value. Specifically, functional relation 110 may establish the slip value by functionally combining the determined slip with constant 108 by, for example, subtracting constant 108 from the determined slip. As such, the slip value may be configured to affect the position and/or movement of implement 14 to achieve or progress toward a desired amount of slip. For example, if the determined slip is greater than constant 108, functional relation 110 may establish the slip value to be a positive value which may, as explained below with respect to functional relation 112, affect a raising movement of implement 14 with respect to surface 18. Similarly, if the determined slip is less than constant 108, functional relation 110 may establish the slip value to be a negative value which may, as explained below with respect to functional relation 112, affect a lowering movement of implement 14 with respect to surface 18. It is contemplated that the magnitude of the slip value may be indicative of the degree of difference between the determined slip and the desired slip. It is contemplated that the reference signs with respect to positive and negative slip values are described herein as exemplary only and may be reversed, i.e., a positive value may affect a lowering movement and a negative value may affect a raising movement of implement 14.

Functional relation 112 may include determining a slip command, e.g., a slip position and/or a slip speed command, configured for controlling the position and/or movement of implement 14. Specifically, functional relation 112 may include one or more multi-dimensional look-up maps and/or one or more equations functionally relating the slip value, e.g., as determined within functional relation 110, and predetermined values. For example, if the slip value is positive, functional relation 112 may establish a position slip command that would raise implement 14 because machine 10 may be experiencing more slip than may be desired. That is, the characteristics of the material may have changed such that the depth of cut of implement 14 may apply a force on machine 10 that undesirably applies too large a resistance on the speed of machine 10. Similarly, if the slip value is negative, functional relation 112 may establish a slip command that would lower implement 14 because machine 10 may be experiencing less slip than desired. That is, the characteristics of the material may have changed such that the depth of cut of implement 14 may apply a force on machine 10 that undesirably applies too small a resistance on the speed of machine 10. Functional relation 112 may, alternatively, establish a slip command that would not affect movement of implement 14 because machine 10 may be experiencing a desired amount of slip.

It is contemplated that functional relation 112 may control the position and/or movement of implement 14 within a range of desirable slip and thus selectively control machine 10 to operate within a desirable range of slip. It is also contemplated that functional relation 112 may establish a slip position command that may be configured to affect the position and/or movement of actuator 16 to achieve a desired depth of cut of implement 14 and may establish a slip speed command that may be configured to affect the speed at which actuator 16 affects movement of implement 14 from one position to another. It is further contemplated that the slip speed command may or may not be a linear relationship relating an existing position, e.g., as determined from a suitably located sensor configured to establish a signal indicative of a current position of implement 14, a desired position, e.g., a position determined to provide a desired amount of slip, and a predetermined amount of time.

Inputs 114, 116 may each include a signal indicative of a pressure associated with hydraulic actuator 16. Specifically, input 114 may be indicative of a pressure at a first time and input 116 may be indicative of a pressure at a second time. The length of time between the first time and the second times may be any suitable duration and may, for example, be on the order of milliseconds. It is contemplated that inputs 114, 116 may be established by a single pressure sensor 26 or may be established by at least two separate pressure sensors, i.e., a dedicated sensor or plurality of sensors for each of inputs 114, 116. It is also contemplated that inputs 114, 116 may be represented in any suitable and/or desirable units, e.g., pounds or newtons. It is also contemplated that the length of time between the first and second times may influence the degree of affect that a force command, further discussed below with respect to functional relation 124, may have on the control of implement 14. For example, a relatively shorter time period may allow control algorithm 100 to more quickly respond to changing material characteristics than a relatively longer time period. It is further contemplated that inputs 114, 116 may, alternatively, include a signal indicative of a force associated with the linkage connecting implement 14 and the frame of machine 10.

Functional relation 118 may include functionally relating first and second pressures, e.g., inputs 114 and 116, to determine an implement force. Implement force may represent the change in force that implement 14 applies on machine 10 and may be caused by resistance that the material applies to implement 14. The magnitude of the implement force may be influenced by the changing characteristics of the material and the depth of cut of implement 14, e.g., relatively low force values may be indicative of relatively homogeneous material characteristics and a relatively high force value may be indicative of a significant change in material characteristics. For example, a relatively high force value may be indicative of implement 14 encountering a large obstacle, e.g., a rock, within a relatively soft material, e.g., soil.

Functional relation 118 may, specifically, include determining implement force by mathematically relating the pressures at the first and second times, e.g., inputs 114, 116, and a one or more constants to convert hydraulic pressure values into implement force values. For example, functional relation 118 may embody the mathematical formula: $F=(P_2-P_1) \times c_1$, wherein F represents implement force, $P_2$ represents a second pressure, $P_1$ represents a first pressure at a time prior to the second pressure, and $c_1$ represents a constant. It is contemplated that $c_1$ may, for example, represent the area of a piston on which pressurized fluid acts to move the piston relative to the cylinder to thereby extend or retract hydraulic actuator 16.

Functional relation 122 may include comparing the implement force, e.g., as determined within functional relation 118, and one or more predetermined values, e.g., constants 120 to determine a force value. Specifically, functional relation 122 may functionally relate the implement force and constants 120 to determine if the implement force is greater than a minimally desired force. Similarly, functional relation 122 may functionally relate the implement force and constants 120 to determine if the implement force is less than a maximum desired force. Alternatively, functional relation 122 may functionally determine if the implement force is within a desired range of force. As such, constants 120 may be configured as a minimum value, a maximum value, or a range of predetermined values.

Functional relation 124 may include determining a force command, e.g., a force position and/or a force speed command, configured for controlling a position and/or movement of implement 14. Specifically, functional relation 124 may include one or more multi-dimensional look-up maps and/or one or more equations functionally relating the force value, e.g., as determined within functional relation 122, and predetermined values. For example, if the force value is positive, functional relation 122 may establish a force command that would raise implement 14 because machine 10 may be experiencing more force than may be desired. That is, the characteristics of the material may have changed such that the depth of cut of implement 14 may apply a force on machine 10 that is undesirably large. If the determined force is negative, functional relation 124 may establish the force command as substantially zero, i.e., no affect on the position and/or movement of implement 14. As such, functional relation 124 may be configured to affect the position and/or movement of implement 14 as a function of the force value when the implement force is above a predetermined value, e.g., a constant, and/or is positive, i.e., when the resistance experienced by implement 14 is increasing.

It is contemplated that functional relation 124 may control the position and/or movement of implement 14 within a range of desirable force experienced by implement 14. It is also contemplated that functional relation 124 may, alternatively, establish a force command that would lower implement 14 if the force value is negative because implement 14 may be experiencing less force than is desired. Similarly to functional relation 112, it is further contemplated that functional relation 124 may establish a force position command that may be configured to affect the position and/or movement of actuator 16 to achieve a desired depth of cut of implement 14 and may establish a force speed command that may be configured to affect the speed at which actuator 16 affects movement of implement 14 from one position to another. It is further contemplated that the force speed command may or may not be a linear relationship relating an existing position, e.g., as determined from a suitably located sensor configured to establish a signal indicative of a current position of implement 14, a desired position, e.g., a position determined to provide a desired amount of slip, and a predetermined amount of time.

Functional relation 126 may include functionally combining the slip command and the force command. Specifically, functional relation 126 may selectively add the force command to the slip command to establish a combined command. As such, the combined command may be a function of both the force and slip commands when the force value is above a predetermined value and may be a function of the slip command and not of the force command when the force value is below a predetermined value. It is contemplated that functional relation 126 may, alternatively, combine the slip and force commands according to any suitable mathematical relation, e.g., an equation increasing the slip command according to a percentage ratio of force to slip command or other factor. As such, functional relation 126 may be configured to affect the position and/or movement of implement 14 to allow machine 10 to operate within a desired slip range, e.g., in a steady state operation, and within a desired force range, e.g., a transient operation and, as such, may represent a combined steady state and transient control for implement 14. It is also contemplated that functional relation 126 may functionally combine the slip and force commands by, for example, summing voltages, summing digital or analog signals, and/or via one or more multi-dimensional maps relating slip, force, and combined commands. It is further contemplated that if the force command would lower implement 14, e.g., the force value is negative, the force command may be selectively combined according to any suitable criteria, e.g., always, never, or dependent upon its relationship to a predetermined value.

Output 128 may include an output command indicative of the combined command, e.g., as determined within functional relation 126, and may be configured to be communicated by controller 20 to the hydraulic system and, in particular, to one or more valves, to affect the flow of pressurized fluid to and from hydraulic actuator 16. For example, output 128 may include a voltage configured to operate a solenoid valve to proportionally or non-proportionally affect movement of a valve stem between a substantially closed position and a fully opened position, as is known in the art. It is contemplated that output 128 may embody any type of signal, such as, for example, an analog or digital signal, a wave, light, or electronic signal, and/or any type of signal known in the art configured to affect the position and/or movement of implement 14. It is also contemplated that output 128 may be configured as an input to one or more other control algorithms configured to affect operation of the hydraulic system, implement 14, and/or machine 10.

INDUSTRIAL APPLICABILITY

The disclosed method and apparatus may be applicable for controlling the position and/or movement of any type of implement configured to engage a material. The disclosed system may provide both steady state and transient control of the implement. The operation of machine 10 and, in particular, control algorithm 100 will be explained below with reference to implement 14 embodied as a ripper for exemplary purposes only. It is noted that the disclosed method and apparatus are applicable to any machine having any ground engaging implement.

Machine 10 may be operated to traverse a site to rip, e.g., break-up, material that may or may not be further manipulated. The material may be substantially hard and/or include numerous rocks which may require ripping before other manipulations may be performed, e.g., scraping, digging, or plowing. As such, implement 14, e.g., a ripper, may be lowered into the material.

Referring to FIG. 1, implement 14 may be positioned by an operator or automatic control to a depth of cut below surface 18 and traction device 12 may be operated to propel machine 10 and thus "pull" implement 14 through the material. The material may have varying characteristics and implement 14 may transition from relatively hard material to relatively soft material and/or implement 14 may encounter significantly large rocks or other obstacles. As such, controller 20 may monitor one or more operating parameters via sensors 22, 24, 26 and affect movement of implement 14 in response thereto. Although implement 14 applies force on machine 10 as a function of the material characteristics, control algorithm 100 may determine a steady state command as a function of the effects such force has on the speed of machine 10, e.g., indirectly, and may determine a transient state command as a function of the effects such force has on the pressure within actuator 16, e.g., directly.

Referring to FIG. 2, control algorithm 100 may receive inputs from sensors 22, 24, 26 representing speed of a driven component, machine speed, a first pressure, and a second pressure, e.g., inputs 102, 104, 114, 116. Control algorithm 100 may perform one or more functional relations to determine a combined command to affect movement and position of implement 14.

For example, as machine 10 moves relative to surface 18 of the material, the material may gradually change from a relatively hard material to a relatively soft material and the determined slip, e.g., as determined within functional relation 106, may decrease below a predetermined minimum value. As such, functional relation 112 may establish a slip command as a function of the determined slip that is configured to lower implement 14 to a deeper depth of cut. Conversely, the material may transition from a relatively soft material to a relative hard material and the determined slip may increase above a predetermined maximum value and a slip command may be established to raise implement 14 to a shallower depth of cut. As such, the determined slip command may affect control of implement 14 and machine 10 over steady state operation, e.g., with respect to a first timing. That is, the slip command may be configured to adjust the position and/or movement of implement 14 in response to gradual changes in the material. The steady state operation may be a function of the inherent time delay associated with implement 14 engaging material having changing characteristics, of the resistive effects such characteristics have on the force implement 14 applies to machine 10, and the resulting affects on the speed of machine 10.

For another example, as machine 10 traverses the work site, the material may include large obstacles, e.g., a large rock, and the implement force, e.g., as determined within functional relation 118, may exceed a predetermined maximum value. As such, functional relation 124 may establish a force command as a function of the implement force that may be configured to raise implement 14 to a shallower depth of cut. As such, the force command may affect control of implement 14 and machine 10 over transient operation. e.g., with respect to a second timing. That is, the determined force may adjust the position and/or movement of implement 14 in response to rapid changes in the material and thus, the second timing may be shorter than the first timing. It is contemplated that the transient operation may be a function of the length of time between inputs 114 and 116.

Control algorithm 100 may combine the determined slip and force commands into a combined command, e.g., as determined within functional relation 126, thus combining both a steady state, e.g., slip, and a transient, e.g., force, component. It is contemplated that by adjusting constants 108, 122, and the timing between inputs 114, 116, the sensitivity of the steady state and transient commands may be varied. For example, increasing the timing between inputs 114, 116 may delay the force command's response time to changes in material characteristics. Also, increasing constant 108 may increase the responsiveness of the slip command's sensitivity to changes in material characteristics, although, it may not increase the inherent delay in response time thereof. Additionally, the magnitude of the value of constant 122 may affect when the force command may be combined with the slip command and thus may influence when a transient condition exists and when control algorithm 100 responds thereto. Output 128 may be indicative of the combined command and may be communicated to one or more algorithms and/or one or more hydraulic components to affect movement of implement 14.

Because the force value may be determined as a change in force experienced by implement 14, control algorithm 100 may more accurately monitor and affect control of implement 14 with respect to changes in material characteristics than if a single force value was utilized. Additionally, because implement 14 may engage a substantially homogenous material that causes a significant and substantially constant resistive force on implement 14, e.g., hard rock, a single force value may not accurately represent material characteristic changes and control of implement 14 to avoid significant obstacles may be undesirably slow. Also, because control algorithm 100 determines steady state and transient commands, control algorithm 100 may more quickly respond to significant changes in material characteristics. Furthermore, control algorithm 100 may provide a simplified control of a ground engaging implement with respect to both steady state and transient control.

It will be apparent to those skilled in the art that various modifications and variations can be made to the disclosed system for controlling implement position. Other embodiments will be apparent to those skilled in the art from consideration of the specification and practice of the disclosed method and apparatus. It is intended that the specification and examples be considered as exemplary only, with a true scope being indicated by the following claims and their equivalents

What is claimed is:

1. A method for controlling a working depth position of an implement of a machine, comprising:
    determining slip of a traction device;
    determining a change in draft force of the implement over a period of time; and
    selectively controlling the working depth position of the implement as a function of slip and the change in draft force.

2. The method of claim 1, further including:
    selectively controlling a working depth position of the implement as a function of slip and not as a function of the chance in draft force when the change in draft force is less than a predetermined value.

3. The method of claim 1, wherein the implement is operably connected to a machine having at least one traction device, the method further including:
    sensing a first speed indicative of a driven component of the at least one traction device;
    sensing a second speed indicative of the machine with respect to a surface, the machine configured to move relative to the surface; and
    determining slip as a function of the first and second speeds.

4. The method of claim 1, wherein the implement is operably connected to a machine via at least one hydraulic actuator, the method further including:
    sensing a pressure of a fluid operably associated with the at least one hydraulic actuator at two different times; and
    determining the change in draft force as a function of the change in pressure sensed at the two different times.

5. The method of claim 1, wherein
    the amount of slip is indicative of a percentage difference between a driven speed and an actual speed.

6. A system for controlling an implement's working depth, comprising:
    at least one hydraulic actuator operatively configured to move the implement with respect to a frame of a machine;
    a traction device operatively connected to the frame and configured to propel the machine relative to a surface of a material;
    a first sensor configured to sense a pressure of fluid associated with the at least one hydraulic actuator;
    a second sensor configured to sense a speed of a driven component of the traction device;
    a third sensor configured to sense a speed of the machine with respect to the surface; and
    a controller configured to:
        receive a plurality of signals indicative of the sensed pressure, the speed of the driven component, and the speed of the machine,
        determine slip of the traction device as a function of the speed of the driven component and the speed of the machine,
        determine a change in draft force of the implement as a function of a change in the sensed pressure measured over a time period, and
        determine an output command configured to affect the working depth position of the implement as a function of the slip and the change in draft force.

7. The system of claim 6, wherein the controller is further configured to
    determine if the change in pressure is greater than a predetermined value.

8. The system of claim 7, wherein determining the output command includes selectively adding an output command associated with the change in draft force to an output command associated with slip only when the change in pressure is greater than the predetermined value.

9. The system of claim 6, wherein determining the output command includes selectively adding an output command associated with the chance in draft force to an output command associated with slip.

10. A machine comprising:
    at least one traction device having a driven component;
    an implement configured to selectively engage a material;
    a first sensor configured to sense a speed of the driven component with respect to the machine and responsively generate a first signal;
    a second sensor configured to sense a speed of the machine with respect to a surface of material and responsively generate a second signal;
    a third sensor configured to sense a pressure of fluid used to affect movement of the implement and responsively generate a third signal;
    a controller configured to:
        receive the first, second, and third signals,
        determine slip as a function of the first and second signals,
        determine a change in draft force acting on the implement over a period of time based on the third signal,
        affect a working depth position of the implement as a function of only slip when the change in draft force is below a predetermined value, and
        affect a working depth position of the implement as a function of slip and the change in draft force when the change in draft force is above the predetermined value.

11. The machine of claim 10, wherein the controller is configured to affect the working depth of the implement by selectively raising and lowering the implement within a work surface.

12. The machine of claim 10, wherein:
    the controller is further configured to determine the change in draft force as a function of a change of the third signal during the period of time.

* * * * *